US012473760B1

(12) United States Patent
Baehl

(10) Patent No.: US 12,473,760 B1
(45) Date of Patent: Nov. 18, 2025

(54) METHOD AND APPARATUS OF A POSITIVE DOOR CHAIN LOCKING MECHANISM

(71) Applicant: Paul Leroy Baehl, Evansville, IN (US)

(72) Inventor: Paul Leroy Baehl, Evansville, IN (US)

( * ) Notice: Subject to any disclaimer, the term of this patent is extended or adjusted under 35 U.S.C. 154(b) by 0 days.

(21) Appl. No.: 18/445,369

(22) Filed: Nov. 3, 2023

(51) Int. Cl.
*E05C 17/36* (2006.01)

(52) U.S. Cl.
CPC .................................... *E05C 17/36* (2013.01)

(58) Field of Classification Search
CPC ....................................................... E05C 17/36
See application file for complete search history.

(56) References Cited

U.S. PATENT DOCUMENTS 252,309 A * 1/1882 Goebel ................. E05C 17/365 292/264
467,165 A * 1/1892 Grandeman .......... E05C 17/365 292/264
2,076,605 A * 4/1937 West ..................... E05C 17/365 292/264
3,669,483 A * 6/1972 Trachsler .............. E05C 17/365 292/264
3,705,504 A * 12/1972 Johnson ................ E05C 17/365 292/264
3,788,107 A * 1/1974 Lippman ............... E05C 17/365 292/264
4,079,973 A * 3/1978 Hollins ................. E05C 17/365 292/264
4,105,231 A * 8/1978 Huyssen ............... E05C 17/365 D8/340
4,648,641 A * 3/1987 Foster ................... E05C 17/365 292/264
4,815,305 A * 3/1989 Smith ................... E05C 17/365 292/264
5,285,666 A * 2/1994 Bartnicki ............. E05C 17/365 292/264
10,890,021 B2 * 1/2021 O'Kane ................ E05C 17/365
2010/0289278 A1 * 11/2010 Tang ........................ E05C 17/32 292/264

* cited by examiner

*Primary Examiner* — Mark A Williams

(57) ABSTRACT

The positive door chain locking mechanism is a retrofitting kit comprises a rotating lock mounted to a prior art mounting plate of a prior art door chain mechanism. The rotating lock rotates easily to a positive locking resting position by counter balance, preventing the removal of a prior art slide pin and a prior art chain from a slot in the prior art mounting plate. The rotating lock rotates easily to a positive unlocking resting position by counter balance, permitting the engagement and the removal of the prior art slide pin and the prior art chain from a slot in the prior art mounting plate of the prior art door chain mechanism. Applications for the positive door chain locking mechanism are not limited to prior art door chain mechanism.

1 Claim, 5 Drawing Sheets

METHOD AND APPARATUS OF A POSITIVE DOOR CHAIN LOCKING MECHANISM

CROSS REFERENCE TO RELATED APPLICATIONS

This application claims the benefit of U.S. Provisional application Ser. No. 18/445,369 filed Nov. 3, 2023 by present inventor.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE MATERIAL SUBMITTED ON A READ-ONLY OPTION DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

TECHNICAL FIELD

The present invention pertains to the field of door chain mechanisms and more particularly, it pertains to the engagement and the removal of a prior art door chain slide pin and a prior art chain from a prior art mounting plate mounted on a prior art door chain mechanism.

BACKGROUND

The positive door chain locking mechanism relates to a prior art door chain mechanisms for security purposes. The prior art door chain mechanisms are well known and have been used for a long time. It has been known when a prior art right hand exterior door and a prior art left hand exterior door is unlocked by a key or lock is picked, a prior art slide pin and a prior art chain can be removed from a slot in a prior art mounting plate of the prior art door chain mechanism mounted on the prior art right hand exterior door and on the prior art left hand exterior door with a prior art coat hanger or any other type of a prior art mechanism (not shown). There is no evidence or indication of any forced entry.

SUMMARY

In the present invention, when a prior art right hand exterior door and a prior art left hand exterior door is opened, a prior art chain allows the door to open a small amount for security purposes. When the prior art right hand exterior door and the prior art left hand exterior door is unlocked by a key or lock is picked by an intruder or a burglar, a prior art slide pin and a prior art chain can be removed from a slot in a prior art mounting plate of a prior art door chain mechanism with a coat hanger or any other type of prior art mechanism (not shown). A positive door chain locking mechanism rotating lock enhances security mounted on the prior art mounting plate rotated to a positive locking resting position by counter balance causing a mechanical locking or binding condition of the prior art slide pin and the prior art chain. Therefore, the prior art slide pin and the prior art chain can not be removed from the slot in the prior art mounting plate with a coat hanger or any other type of prior art mechanism (not shown). The positive door chain locking mechanism rotating lock mounted on the prior art mounting plate rotated to a positive unlocking resting position by counter balance, the prior art slide pin and the prior art chain can be removed from the slot in the prior art mounting plate. The positive door chain locking mechanism rotating lock rotated to the positive locking resting position by counter balance, entry through the prior art right hand exterior door and the prior art left hand exterior door can only be made by cutting the prior art chain with a prior art chain cutter (not shown) or by using excessive force on the prior art right hand exterior door and on the prior art left hand exterior door. Therefore, ripping a prior art bracket off the inside of a prior art door jam (not shown). The positive door chain locking mechanism rotating lock rotated to the positive locking resting position provides evidence of forced entry. The positive door chain locking mechanism enhances security for personal safety, for insurance purposes of any property damages or loses, and for police reporting of illegal entry.

DETAILED DESCRIPTION OF THE PREFERRED EMBODIMENT

The preferred embodiment of the preferred positive door chain locking mechanism is described here-in below with reference to the attached drawings.

Figure 1:
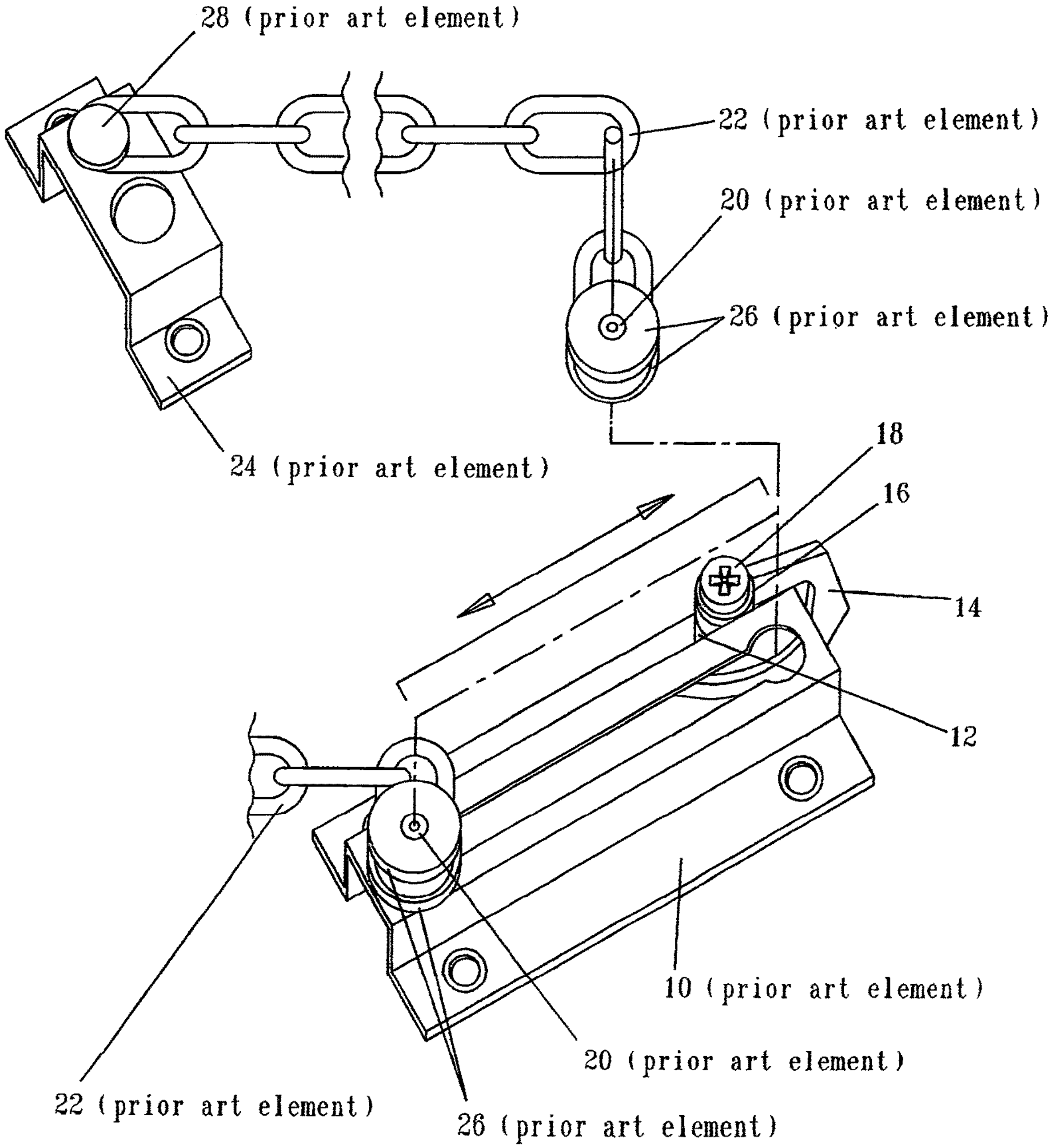
FIG. 1 is a perspective view of a positive door chain locking mechanism rotating lock rotated in a positive locking resting position in a slot of a prior art mounting plate in a locked position.
Figure 2:
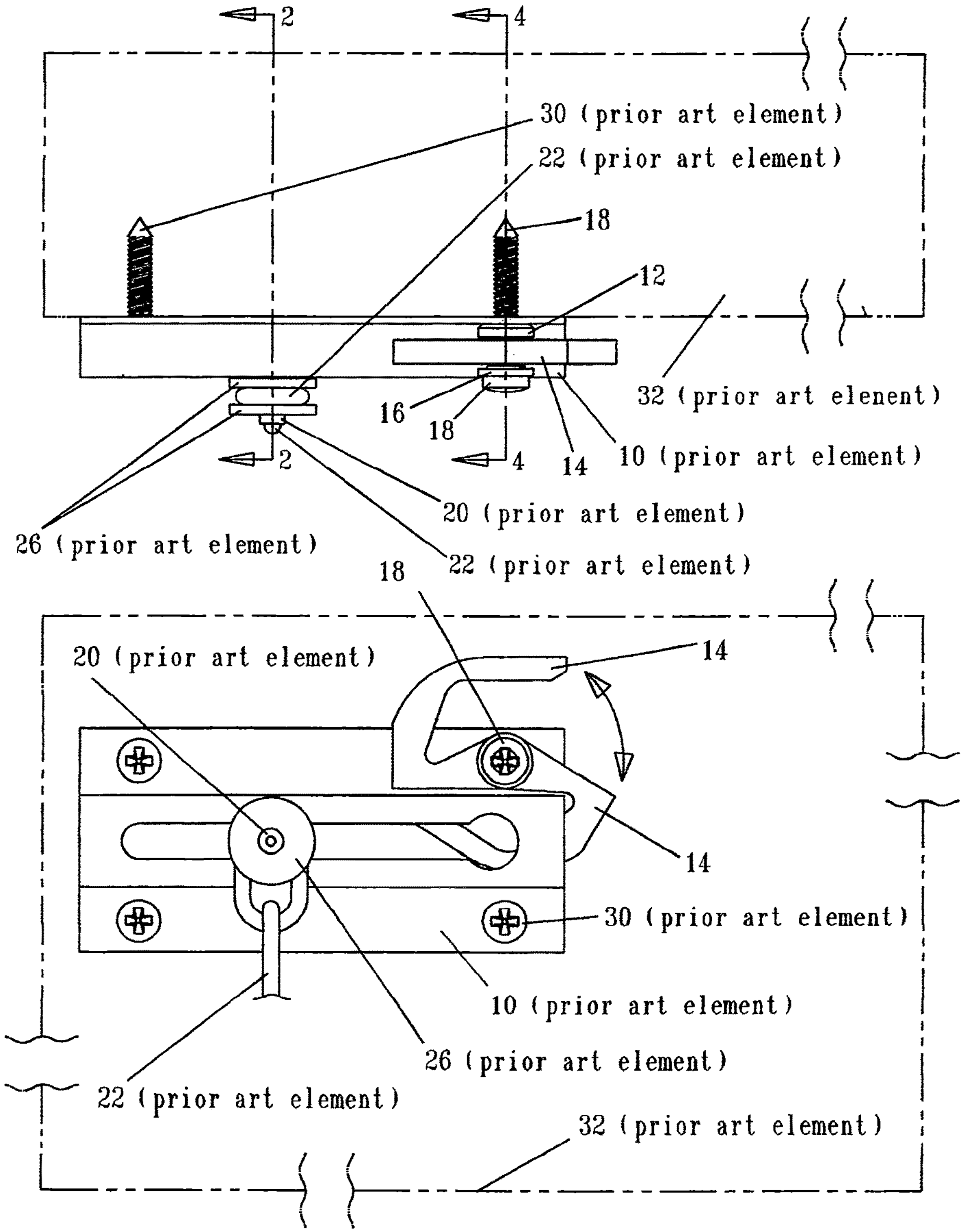
FIG. 2 is an orthogonal view showing a front side view and a top side view of a positive door chain locking mechanism rotating lock in a positive locking resting position and in a positive unlocking resting position mounted on a prior art mounting plate mounted on a prior art right hand exterior door.
Figure 5:
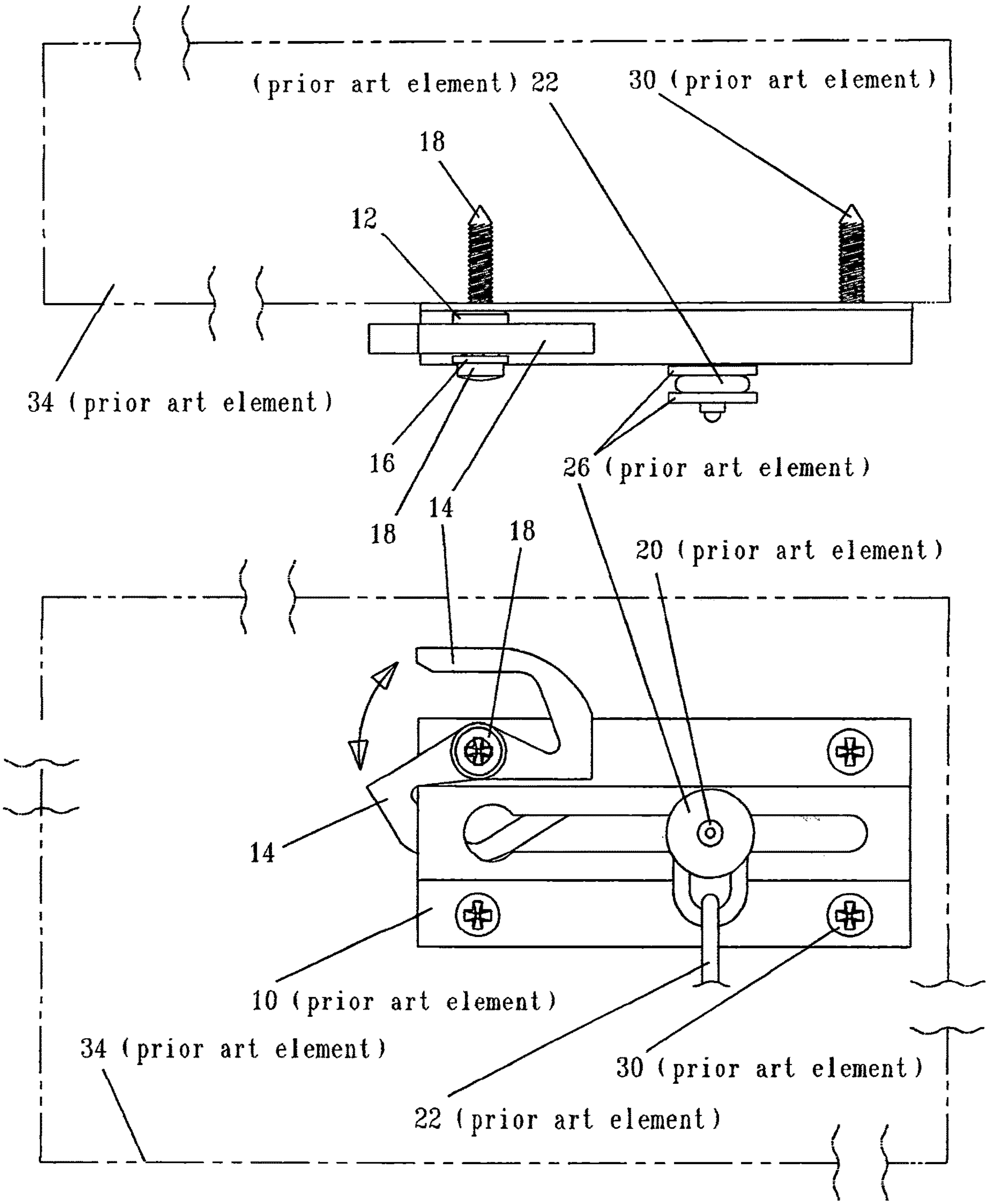
FIG. 5 is an orthogonal view showing a front side view and a top side view of a positive door chain locking mechanism rotating lock in a positive locking resting position and in a positive unlocking resting position mounted on a prior art mounting plate mounted on a prior art left hand exterior door.

FIG. 1 is a perspective view related to FIGS. 2 and 5 showing a positive door chain locking mechanism rotating lock 14 rotated in a positive locking resting position by counter balance. A positive door chain locking mechanism pivot pin 12, a positive door chain locking mechanism washer 16, a positive door chain locking mechanism mounting screw 18, a prior art slide pin 20 in a positive security or locked position in a slot of a prior art mounting plate 10, a prior art chain 22, a prior art washer 26, a prior art pin 28, and a prior art bracket 24 mounted on an inside prior art door jam of a prior art exterior right hand exterior door 32 and a prior art left hand exterior door 34 (not shown).

FIG. 2 is an orthogonal of a front side view and a top side view related to FIGS. 1 and 5 showing a top right prior art mounting screw 30 on the front side view removed from a prior art mounting plate 10 on a prior art right hand exterior door 32. The positive door chain locking mechanism pivot pin 12 inserted in a hole of a positive door chain locking mechanism rotating lock 14, therefore, supporting the positive door chain locking mechanism rotating lock 14 during rotation. The positive door chain locking mechanism mounting screw 18 inserted in a hole of a positive door chain locking mechanism washer 16, in a hole of the positive door chain locking mechanism pivot pin 12, and in a hole of the prior art mounting plate 10 and mounted to the prior art right hand exterior door 32. The positive door chain locking mechanism rotating lock 14 rotated in a positive locking resting position in the prior art mounting plate 10 by counter balance and in a positive unlocking resting position on the prior art mounting plate 10 by counter balance.

Figure 3:
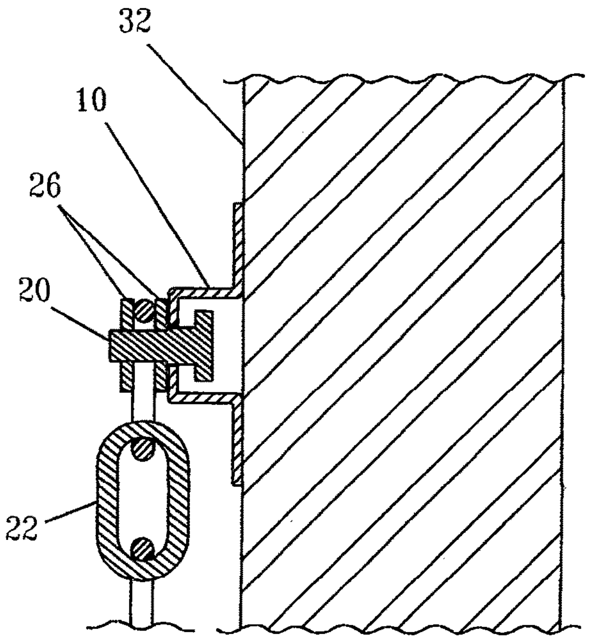
FIG. 3 PRIOR ART
FIG. 3 is a cross section view showing a prior art mounting plate, a prior art slide pin, a prior art chain, a prior art washer, and a prior art mounting screw mounted on a prior art right hand exterior door as seen along line 2-2 in FIG. 2.

FIG. 3 is a cross-section view related to FIGS. 1 and 5 showing a prior art slide pin 20, a prior art chain 22, a prior art washer 26, and a prior art mounting plate 10 mounted on a prior art right hand exterior door 32 as seen along line 2-2 in FIG. 2.

Figure 4:
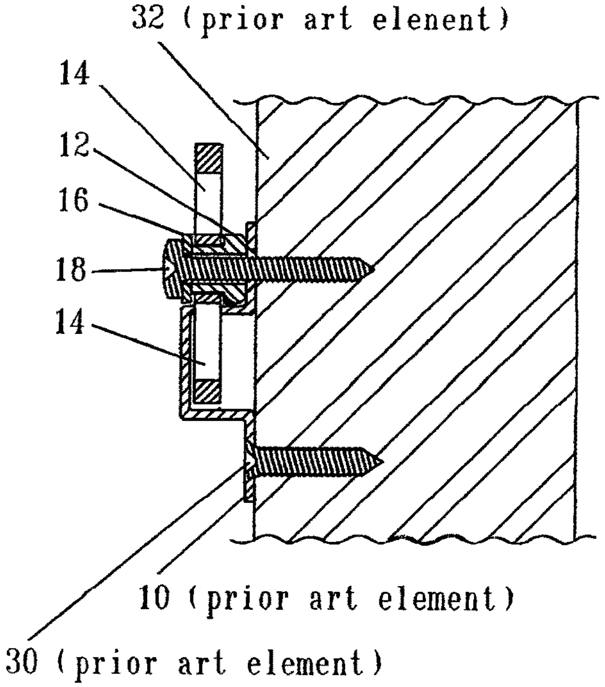
FIG. 4 is a cross section view showing a positive door chain locking mechanism pivot pin, a positive door chain locking mechanism rotating lock, a positive door chain locking mechanism washer, and a positive door chain locking mechanism mounting screw mounted on a prior art right hand door as seen along line 4-4 FIG. 2.

FIG. 4 is a cross-section view related to FIGS. 1 and 5 showing a positive door chain locking mechanism pivot pin 12, a positive door chain locking mechanism rotating lock 14, in a positive locking resting position and in a positive unlocking resting position, a positive door chain locking mechanism mounting screw 18 mounted on a prior art right hand exterior door 32 as seen along line 4-4 in FIG. 2.

FIG. 5 is an orthogonal of a front side view and a top side view related to FIGS. 1 and 2 showing a top left prior art mounting screw 30 on the front side view removed from a prior art mounting plate 10 on a prior art left hand exterior door 34. The positive door chain locking mechanism pivot pin 12 is inserted in a hole of a positive door chain locking mechanism 14, therefore, supporting the positive door chain locking mechanism rotating lock 14 during rotation. The positive door chain locking mechanism mounting screw 18 inserted in a hole of a positive door chain locking mechanism washer 16, in a hole of the positive door chain locking mechanism pivot pin 12, in a hole of the prior art mounting plate 10, and mounted to a prior art left hand exterior door 34. The positive door chain locking mechanism rotating lock 14 located in a positive locking resting position in the prior art mounting plate 10 by counter balance and in a positive unlocking resting position on the prior art mounting plate 10 by counter balance.

Figure 6:
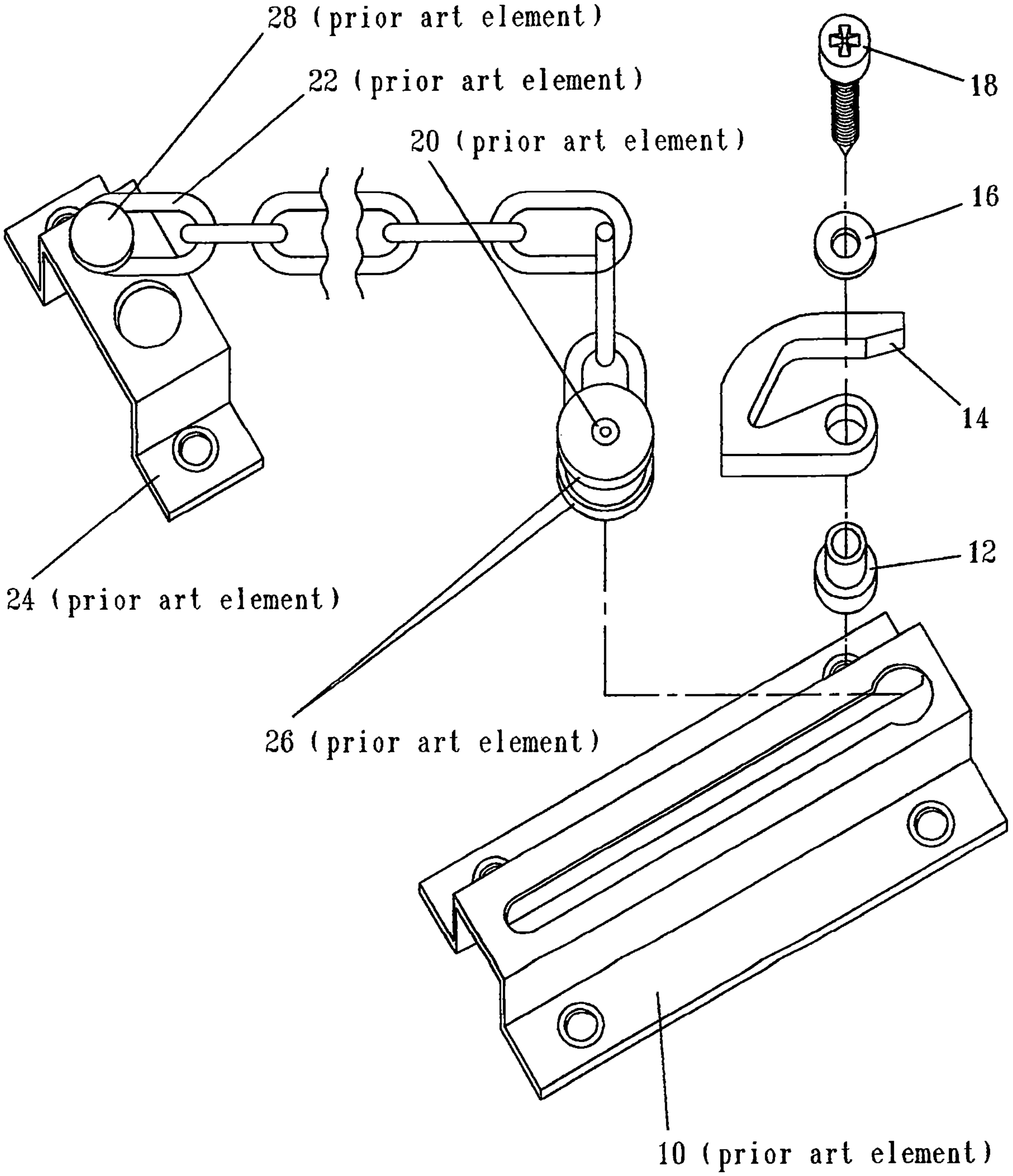
FIG. 6 is a perspective exploded view of a positive door chain locking mechanism and a prior art door chain mechanism.

FIG. 6 is a perspective exploded view related to FIGS. 1, 2 and 5 showing a positive door chain locking mechanism rotating lock 14, a positive door chain locking mechanism pivot pin 12, a positive door chain locking mechanism mounting screw 18, a positive door chain locking mechanism washer 16, a prior art mounting plate 10, a prior art slide pin 20, a prior art door chain 22, a prior art bracket 24, a prior art washer 26, and a prior art pin 28.

DRAWINGS REFERENCE NUMERALS

- 10 prior art mounting plate
- 12 positive door chain locking mechanism pivot pin
- 14 positive door chain locking mechanism rotating lock
- 16 positive door chain locking mechanism washer
- 18 positive door chain locking mechanism mounting screw
- 20 prior art slide pin
- 22 prior art door chain
- 24 prior art bracket
- 26 prior art washer
- 28 prior art pin
- 30 prior art mounting screw
- 32 prior art right hand exterior door
- 34 prior art left hand exterior door Advantages From the description above, a number of advantages of a positive door chain locking mechanism become evident:

(a) The positive door chain locking mechanism is a retrofitting kit is easily mounted to a prior art door chain mechanism on a prior art right hand exterior door and on a prior art left hand exterior door.

(b) The positive door chain locking mechanism rotating lock rotated to a positive locking resting position in a prior art door chain mechanism mounting plate by counter balance, a prior art slide pin and a prior art chain can not be removed from a slot in a prior art door chain mechanism mounting plate.

(c) The positive door chain locking mechanism rotating lock rotated to a positive unlocking resting position on a prior art door chain mechanism mounting plate by counter balance, a prior art slide pin and a prior art chain can be removed from a slot in a prior art door chain mechanism mounting plate.

(d) The positive door chain locking mechanism rotating lock rotates easily from a positive unlocking resting position on a prior art door chain mechanism mounting plate to a positive locking resting position in a prior art door chain mechanism mounting plate and from a positive locking resting position to the positive unlocking resting position.

(e) The positive door chain locking mechanism is easily mounted to a prior art door chain mechanism mounting plate, using only a screwdriver.

(f) The positive door chain locking mechanism enhances the safety and security for a resident and provides evidence of illegal entry of an intruder and burglar.

(g) The positive locking mechanism may be manufactured using different types of material for unlimited applications.

What is claimed is:

1. A positive door chain locking mechanism for use with a prior art existing door chain mechanism for securing a door, the positive door chain locking mechanism comprising:

an independently mounted retrofitting kit configured to be mounted on an existing prior art door chain mechanism mounting plate, the retrofitting kit comprising a mounting screw, washer, pivot pin, and rotating lock, the rotating lock having a first positive unlocking resting position and a second positive locking resting position, wherein the rotating lock is maintained in the second positive locking resting position by a counter balance due at least in part to the weight of the rotating lock;

said mounting screw is inserted into a hole of said washer, a hole of said pivot pin, and insertable into a hole of said existing prior art door chain mechanism mounting plate; therefore, said mounting screw is configured to replace an existing prior art mounting screw and mounts said positive door chain locking mechanism on said prior art door chain mechanism mounting plate, on a prior art right hand exterior door, and, alternatively, on a prior art left hand exterior door;

said pivot pin being inserted in a hole of said rotating lock to support said rotating lock for rotating from said first positive unlocking resting position on said prior art door chain mechanism mounting plate to said second positive locking resting position in said prior art door chain mechanism mounting plate; said rotating lock on said pivot pin rotates easily from said first positive unlocking resting position to said second positive locking resting position in said prior art door chain mechanism mounting plate by said counter balance causing a mechanical locking or binding condition; therefore, preventing removal of a prior art slide pin and a prior art door chain from a slot in said prior art door chain mechanism mounting plate;

wherein, said rotating lock on said pivot pin rotates easily from said second positive locking resting position to said first positive unlocking resting position by said counter balance; therefore, permitting removal of said prior art slide pin and said prior art door chain from said slot in said prior art door chain mechanism mounting plate; said washer on said mounting screw secures said rotating lock on said pivot pin; therefore, said rotating lock can easily rotate from said first positive unlocking resting position to said second positive locking resting position.

* * * * *